United States Patent
Haddow et al.

(10) Patent No.: US 9,902,516 B2
(45) Date of Patent: Feb. 27, 2018

(54) METHOD FOR MAKING POUCHES

(71) Applicants: TEEPACK SPEZIALMASCHINEN GmbH & Co. KG, Meerbusch (DE); MOLINS PLC, Milton Keys (GB)

(72) Inventors: Phil Haddow, Potton (GB); Peter Whitlock, Leek Wootton (GB); Bradley Wiggett, Birmingham (GB); Stefan Lambertz, Hurth (DE)

(73) Assignees: Teepack Spezialmaschinen GmBH & Co. KG, Meersbusch (DE); Molins PLC, Milton Keynes (GB)

( * ) Notice: Subject to any disclaimer, the term of this patent is extended or adjusted under 35 U.S.C. 154(b) by 472 days.

(21) Appl. No.: 14/609,396

(22) Filed: Jan. 29, 2015

(65) Prior Publication Data

US 2016/0221702 A1   Aug. 4, 2016

(51) Int. Cl.
*B65B 61/12* (2006.01)
*B65B 39/00* (2006.01)
(Continued)

(52) U.S. Cl.
CPC .............. *B65B 61/12* (2013.01); *B29C 65/18* (2013.01); *B29C 65/7891* (2013.01);
(Continued)

(58) Field of Classification Search
CPC ....... B65B 61/007; B65B 61/02; B65B 61/12; B65B 43/123; B65B 43/267;
(Continued)

(56) References Cited

U.S. PATENT DOCUMENTS 2,721,017 A * 10/1955 Hiscock ................. B65B 9/087
                                                          141/114
3,453,799 A *  7/1969 Cloud ................... B65B 9/087
                                                          53/385.1
(Continued)

FOREIGN PATENT DOCUMENTS

GB          1295618 A      11/1972
WO       2007/089838 A2     8/2007
WO     WO 2013/117204 A1 *  8/2013 ............. B65B 29/04

OTHER PUBLICATIONS

Prosecution Document, European Patent Office, "European Search Report for European Patent Application No. 12006916.6", Mar. 5, 2013, 5 pages.

*Primary Examiner* — Thanh Truong
*Assistant Examiner* — Nicholas Igbokwe
(74) *Attorney, Agent, or Firm* — Dorsey & Whitney LLP (57) ABSTRACT

The present invention relates to a method for making pouches providing a continuous web; folding the web to provide confronting side surfaces joined along a bottom edge; forming a vertical seal between the confronting side surfaces, thereby providing a series of adjacent pockets having opposite side walls with each pocket having an unsealed opening along a top edge; filling the pockets through the unsealed opening with material; sealing the unsealed opening. In the inventive method, which facilitates handling of the continuous web forming the pouches, the web is perforated by a perforation between a leading length piece of the web adapted to form a leading pocket and a trailing length piece of the web adapted to form a trailing pocket, and the distance between a trailing edge of the leading length piece and a leading edge of a trailing length piece is increased for tearing the leading and the trailing lengths pieces apart at the perforation.

11 Claims, 10 Drawing Sheets

(51) Int. Cl.
*B65B 37/00* (2006.01)
*B65B 43/04* (2006.01)
*B65B 51/10* (2006.01)
*B65B 61/02* (2006.01)
*B29C 65/00* (2006.01)
*B65B 39/12* (2006.01)
*B65B 39/14* (2006.01)
*B65B 43/26* (2006.01)
*B65B 43/32* (2006.01)
*B65B 43/34* (2006.01)
*B65B 43/46* (2006.01)
*B65B 51/18* (2006.01)
*B65B 9/087* (2012.01)
*B29C 65/18* (2006.01)
*B29C 65/78* (2006.01)
*B65B 61/28* (2006.01)

(52) U.S. Cl.
CPC .... *B29C 66/1122* (2013.01); *B29C 66/43121* (2013.01); *B29C 66/73921* (2013.01); *B29C 66/81422* (2013.01); *B29C 66/83421* (2013.01); *B29C 66/849* (2013.01); *B65B 9/087* (2013.01); *B65B 39/12* (2013.01); *B65B 39/145* (2013.01); *B65B 43/267* (2013.01); *B65B 43/32* (2013.01); *B65B 43/34* (2013.01); *B65B 43/465* (2013.01); *B65B 51/18* (2013.01); *B65B 61/02* (2013.01); *B65B 61/28* (2013.01); *B65B 2039/009* (2013.01)

(58) Field of Classification Search
CPC ....... B65B 43/265; B65B 29/02; B65B 39/12; B65B 39/145; B65B 43/32; B65B 43/34; B65B 43/465; B65B 51/18; B26F 3/002; B29C 66/08; B29C 66/83421; B29C 66/849
USPC .................. 53/450, 452, 455, 562, 553, 558
See application file for complete search history.

(56) References Cited

U.S. PATENT DOCUMENTS

| | | | | |
|---|---|---|---|---|
| 4,726,170 | A * | 2/1988 | Sawa | B65B 43/30 53/386.1 |
| 4,956,964 | A * | 9/1990 | Jones | B65B 43/465 198/803.9 |
| 4,999,968 | A * | 3/1991 | Davis | B26D 1/626 383/200 |
| 6,119,439 | A * | 9/2000 | Stevie | B26D 1/626 53/455 |
| 7,954,307 | B2 * | 6/2011 | Paunesku | B65B 9/087 53/284.7 |
| 2002/0005101 | A1 * | 1/2002 | Lohrey | B26F 3/002 83/100 |
| 2004/0202804 | A1 * | 10/2004 | Lerner | B29C 65/18 428/34.1 |

* cited by examiner

METHOD FOR MAKING POUCHES

TECHNICAL FIELD

The present invention relates to a method for making pouches.

BACKGROUND

A method for producing pouches comprising the steps of providing a continuous web, folding the web to provide confronting side surfaces joined along a bottom edge and forming a vertical seal between the confronting side surfaces, thereby providing a series of adjacent pockets having opposite side walls, with each pocket having an unsealed opening along a top edge, and filling the pockets through the opening with material and then sealing the opening to provide sealed pouches is known from WO 2007/089838 A2.

In the known method, the continuous web is guided through a vertical sealer in which the vertical seals are formed after the continuous web has been folded. Those vertical seals are spaced from one another to provide a pocket which is defined by the bottom edge as the bottom of the pocket and a leading edge which is defined by a vertical seal, and a trailing edge which is defined by the neighboring vertical seal. The vertical seal is provided such that neighboring pockets can be separated without impeding the closure of the pocket by the vertical seal. By separating the pockets, individual pouches are formed.

In the method known from WO 2007/089838 A2, the continuous web is transferred to a cutting section in which the continuous web is cut to isolate individual pouches having an unsealed opening along the top edge. Those pouches are transferred by a vacuum belt transport means against which the separated pouches are sucked and transferred to a filler wheel. The filler wheel has gripping elements which are adapted to grip the leading and tailing edges of each pouch, respectively, between jaws and are movable relative to each other to open the unsealed opening. As the distance between the leading and the tailing edges of one single pouch is reduced, the distance between the confronting side surfaces in increased. Accordingly, spouts of a spout wheel can be introduced into the pouches for filling the same with material. The spout wheel and the filler wheel are rotatably driven. The rotational axis of the filler wheel is essentially co-axial to the rotational axis of the spout wheel. However, the rotational axes are slightly inclined relative to each other. At a circumferential section in which the distance between the spout wheel and the filler wheel is at its minimum, a respective spout is received within the open mouth of the pouches and then continuously retracted from the pouch as the filler wheel and the spout wheel are continuously rotated, starting from this position.

After the pouches have been filled, the gripping means are actuated such that the distance between the leading and the tailing edges of the each spout are increased, thereby bringing the confronting side surfaces closer together and closing the unsealed opening. In the course of the circular path along the outer circumference of the filler wheel, the pouches are finally sealed by a sealing section arranged at the outer circumference of the filler wheel and provided with heated sealing surfaces abutting against the folded web material for sealing the opening.

The method known from WO 2007/089838 A2 and the apparatus for carrying out said method is disadvantageous in that it requires a fusible film material for making the web. Fusible film materials are not suitable for making a packaging for e.g. tea, coffee or the like, because these substances have to be brewed while still contained in the pouch. Further, fusible film materials usually require a plastic material for forming the web or at least a plastic coating on the web, which may be disadvantageous for ecological reasons in case the material has to breathe.

Further, the apparatus known from WO 2007/0898238 A2 has a complex constitution, which may be troublesome due to the fact that each pouch is gripped at its leading and trailing edge by a gripping unit. The gripping unit makes manufacturing of the apparatus for carrying out the packaging method expensive. The vacuum belt transport means add to the rather complex constitution of the known apparatus. Further, handling of isolated pouches may cause problems, in particular if pouches are to be made in a fast and economic way.

U.S. Pat. No. 4,534,185 A is a further example of a method in which pouches are formed from a continuous web and then transferred as individual items to a filler wheel in which the pouches are filled with material, then sealed and finally discharged from the filler wheel as sealed pouches. The drawbacks of the apparatus and the method known from this prior art document are essentially the same as the ones discussed with reference to WO 2007/089838 A2. A similar method and apparatus are disclosed in JP 11 292001 A.

U.S. Pat. No. 3,563,001 A is an example of an apparatus and a method in which vertical seals are formed on a wheel defining a vertical filler. The continuous web providing pockets between the vertical seals and a bottom edge is continuously conveyed to a filler wheel in which the pockets are filled with material, essentially in the same way as discussed above with reference to WO 2007/089838 A2. The continuous web is transferred from the circular path around the filler wheel to a linear path and to a top sealer in which the unsealed opening of the pockets is sealed. Then, the continuous web is twisted such that the vertical orientation of the web is transferred into a horizontal orientation. In said horizontal orientation, the web is conveyed to a cutting table on which the material defining the pockets is cut at the vertical seal to thereby isolate individual sealed pouches, which are made to slide from the cutting table.

A respective apparatus and method is described e.g. in U.S. Pat. No. 5,502,951 A, U.S. Pat. No. 3,597,898 A, CA 2 142 480 A1 or U.S. Pat. No. 6,058,818 A. The aforementioned prior art with a separate cutting station for separating the pouches from a continuous web are bulky. Furthermore, pouches separated on the cutting table have to be collected after cutting in order to further process the individual pouches. In other words, the predetermined orientation and holding of individual pouches is lost during cutting, making processing of the filled and sealed pouches troublesome.

The present invention aims to provide a method form making pouches and a packaging apparatus for making pouches by at least partially avoiding the aforementioned disadvantages and drawbacks. In particular, the present invention aims to improve the method known from WO 2007/089838 A2 such that transfer of the web to the filler wheel is facilitated, and to improve the packaging apparatus in particular to reduce complexity and bulkiness of the apparatus known from WO 2007/089838 A2.

SUMMARY

As a solution to the aforementioned problem, the present invention provides a method in which the web is perforated to form a perforation between a leading length piece of the web and a trailing length piece of the web. The respective length pieces are adapted to form a leading pocket and a trailing pocket, respectively. In the inventive method, the web may be perforated before forming the vertical seal, during forming the vertical seal or after forming the vertical seal. Accordingly, the inventive method specifies the forming step of a perforation between length pieces. Those length pieces may already correspond to the length of pockets, i.e. length sections of the web being provided with the vertical seal. However, as opposed to the method known from WO 2007/089838 A2, the web is not separated to form isolated pouches, but only perforated such that the continuous web can be treated as a continuum and e.g. prepared for filing the pockets with material and/or filling the pockets while the continuous web still exists. In the inventive method, the length pieces forming the pouches are separated by tearing them from the continuous web. For this, the inventive method proposes to increase the distance between a trailing edge of the leading length piece and a leading edge of the trailing length piece. The trailing edge of the leading length piece and/or the leading edge of the trailing length piece may be defined by the perforation. Increasing of the length of adjacent edges of neighboring length pieces will lead to an increased strain on the web at the location of the perforation. Finally, the web will be torn at the perforation, thereby isolating the separated length pieces.

In the description of the present invention, reference is made to the feature "vertical seal". This vertical seal is a seal which is provided at predetermined distances along the longitudinal axis of the folded web. The vertical seal is usually arranged in vertical direction upon filling of the pocket. The feature "vertical seal" does not specify the orientation of the continuous web when the vertical seals are made. When making the vertical seals, the continuous web can have any orientation. The vertical seals can be made by any suitable method adapted to connecting the confronting side surface of the folded web to each other on a regular basis, vertical sealing is achieved by the application of heat to melt a fusible material arranged between the confronting side surfaces of the continuous web to be joined by the vertical seal.

On a general basis, the length pieces are separated after pockets have been formed. Thus, tearing of the continuous web will lead to isolation of individual pouches. Tearing of the continuous web is usually conducted before the pouches are filled. In this preferred embodiment the trailing edge of the leading length piece and the leading edge of the trailing length piece are defined by a trailing and a leading end, respectively, of neighboring individual pouches. Those neighbouring leading and trailing edges are usually formed by a single vertical seal, i.e. a seal which has been produced at one instance but may have different sealing section separated by a mid area in which a perforation is made.

Preferably, tearing of the continuous web is conducted as the web is moving in a circular path. For this, the continuous web is preferably abutted against an outer circumference of a rotating filler wheel. In the course of the rotational movement of the filler wheel, the continuous web follows the circular path. According to the preferred embodiment, the leading and the trailing length pieces are torn apart while the length pieces are moved on the circular path, i.e. while rotating with the filler wheel. In the course of the tearing action, not only the pockets are isolated to render the same pouches but tearing will likewise bring the leading and the trailing edge of a single length piece closer together, thereby urging the confronting side surfaces away from each other at the unsealed opening to open the unsealed opening.

Thus, tearing apart the length pieces will not only isolate the length pieces but will also widen the opening to facilitate the filling of the pocket with material.

According to a preferred embodiment, the trailing edge of the leading pocket is pierced by a trailing arm of a leading gripping unit of the filler wheel and the leading edge of the trailing pocket is pierced by a leading arm of a trailing gripping unit of the filler wheel. The leading and the trailing pockets are torn apart for forming open pouches by pivoting at least one of the leading and the trailing arms toward the other of the trailing and the leading arms of the same gripping unit. The axis around which the at least one arm is pivoted generally extends parallel to the rotational axis of the filler wheel. In other words, by pivoting the at least one arm, the forward free ends of both arms are brought closer to each other in circumferential direction of the filler wheel. This applies at least to an upper end section of the pocket and/or pouch. For such piercing action, an end side of the free end of each arm is usually provided with needles which are adapted to pierce the material forming the continuous web. The needles may be movable relative to the arm. On a regular basis, the needles are securely held by the respective arms.

In order to secure the continuous web to the leading and the trailing arms, the web is preferably pressed against those arms by a rotating pressure roll. This rotary pressure roll usually cooperates with the radial end face of each trailing and leading arm, respectively. The rotary pressure roll is usually arranged stationary while the filler wheel is rotating.

For facilitating the filling of the pouches, a longitudinal opening guide means is preferably introduced between the confronting side surfaces. Respective longitudinal opening guide means is usually arranged at the outer circumference of the filler wheel such that the unsealed opening receives the longitudinal opening guide means. Accordingly, the longitudinal opening guide means is introduced through the unsealed opening into an upper end section of the pouch. In said upper end section, the vertical seal usually does not exist. Accordingly, this vertical end section be identified as an unsealed vertical end section. The overall length of the unsealed vertical end section in relation to the overall vertical length of the folded web is usually between 3% and 15%, preferably between 3% and 10%. The longitudinal opening guide means usually comprises a guide wedge which is adopted to be introduced into the open mouth of the open pouch. The guide wedge usually extends in circumferential direction and with distance to radial end face of the arms. The guide wedge is usually slightly inclined relative to the plane comprising the filler wheel, which plane extends perpendicular to the rotational axis of the filler wheel. Thus, and as the pouches are rotating with the rotational movement of the filler wheel, the guide wedge is introduced into the open pouch.

The longitudinal opening guide means usually has a chamfered widening section arranged to be received within the pouch to force the confronting side surface away from each other. This chamfered widening section is arranged at a position in which the longitudinal guide means are already introduced into the open pouch. In the sequence of the circular path on which the pockets move, guide rails extend from the widening section. Said guide rails are spaced from one another and extend essentially in circumferential direction of the filler wheel. The radial distance between the guide rails is preferably selected such that at least a tip of an assigned spout of the spout wheel may be projected between the guide rails.

Irrespective of the specific means for attaining such a separation of the confronting side surface by the longitudinal opening guide means, it is preferred to provide a separation of the confronting side surfaces by such longitudinal opening guide means until a spout of the spout wheel has been introduced into the pocket. Accordingly, the longitudinal opening guide means preferably extends only over a certain circumferential length along the outer circumference of the filler wheel until the spout has been introduced into the pocket through the unsealed opening.

According to a further preferred embodiment of the inventive method, the leading and the trailing length pieces are torn apart as the longitudinal opening guide means are received between the confronting side surfaces. Accordingly, the longitudinal opening guide means will assist separation of the confronting side surfaces and thus opening of the unsealed opening of the spout in the course of the carrying action.

According to a further preferred embodiment of the present invention, the pouches are closed by pivoting at least the leading and the trailing arms away from the other of the trailing and the leading arms of the same gripping unit after filling of the pouch. Accordingly, by the pivotable movement of the at least one arm, the confronting side surfaces of each pouch are brought closer to each other at least at an upper end section thereof, i.e. in the region of the unsealed opening. Accordingly, in this preferred embodiment, the pouches are formed while moving on the circular path provided by the filler wheel, are opened on said circular path, are filled while the spout is introduced into the pouch and while moving on the circular path and are subsequently closed by straightening the unsealed opening along the top edge of the pouch while moving on the circular path.

After this, the pouches are sealed at the top edge to enclose the volume of the pouch containing the material filled in each pouch. According to a preferred embodiment of the present invention, the pouches are transferred from the circular path provided by the filler wheel to a linear sealing path, in which the opening is sealed.

The present invention furthermore specifies an apparatus for making pouches as previously known from WO 2007/089838 A2. This known apparatus has feeding means for feeding a continuous web and folding means for folding the web to provide confronting surfaces joined along a bottom edge. Further, vertical sealing means are provided for forming a vertical seal between the confronting side surfaces at spaced intervals along the web, thereby providing a series of adjacent pockets having opposite side walls with each pocket having an unsealed opening along a top edge. The generic packaging apparatus furthermore has filling means for filling the pockets with a material and horizontal sealing means for finally sealing the unsealed opening. Those means defining the preamble of claim 10 may be formed as described e.g. in WO 2007/089838 A2.

The inventive packaging apparatus comprises feeding means for feeding a continuous web; folding means for folding the web to provide confronting surfaces joined along a bottom edge; vertical sealing means for forming a vertical seal between the confronting side surfaces at spaced intervals along the web, thereby providing a series of adjacent pockets having opposite side walls with each pocket having an unsealed opening along a top edge; filling means for filling the pockets with a material; horizontal sealing means for sealing the opening; perforation means for perforating the continuous web between a leading length piece of the web adapted to form a leading pocket and a trailing length piece of the web adapted to form a trailing pocket, and tearing means adapted to tear the leading length piece and the trailing length piece apart by increasing the distance between a trailing edge of the leading length piece and a leading edge of the trailing length piece.

Such apparatus is in particular suitable for carrying out the inventive method and for avoiding any cutting of the continuous web to isolate the pouches from the continuous web before the same is secured to the filler wheel. The inventive apparatus is in particular suitable for tearing apart a continuous web made of infiltratable material, such as e.g. the material of which filter bags for tea and other brewable or extractable substances are usually made of.

According to a preferred embodiment of the present invention, the filling means and the tearing means are assigned to a rotatable filler wheel, thereby providing a separation section at the circumference of the filling wheel and, furthermore, a closing section in which the tearing action is reverted to bring the confronting side surfaces at the top edge closer together.

According to a further preferred embodiment of the present invention, the filler wheel comprises plural leading and trailing arms assigned to pierce the leading and the trailing edge of a length piece of the continuous web adapted to form a single pouch, respectively. At least one of those leading and trailing arms, each of which is assignable to a specific length piece and/or pocket of the continuous web and thus forming a gripping unit for such length piece and/or pocket, is pivotably supported on the filler wheel about an axis extending essentially parallel to the rotational axis of the filler wheel to bring radial free ends of the respective arms closer to each other in circumferential direction of the filler wheel. Each of the radial end faces is provided with needles which project in radial direction and are adapted to pierce the continuous web to secure the same against the leading and the trailing arms, respectively. Securing is attained such that pivotable movement of the at least leading or trailing arm will increase the distance between the trailing edge of a leading length piece and the leading edge of a trailing length piece to thereby tear the continuous web between those to neighboring edges to separate the pouches.

BRIEF DESCRIPTION OF THE DRAWINGS

Further details, advantages and features of the present invention will become apparent from the following description of a specific embodiment thereof in connection with the drawing. In the drawing.

DETAILED DESCRIPTION

Figure 1:
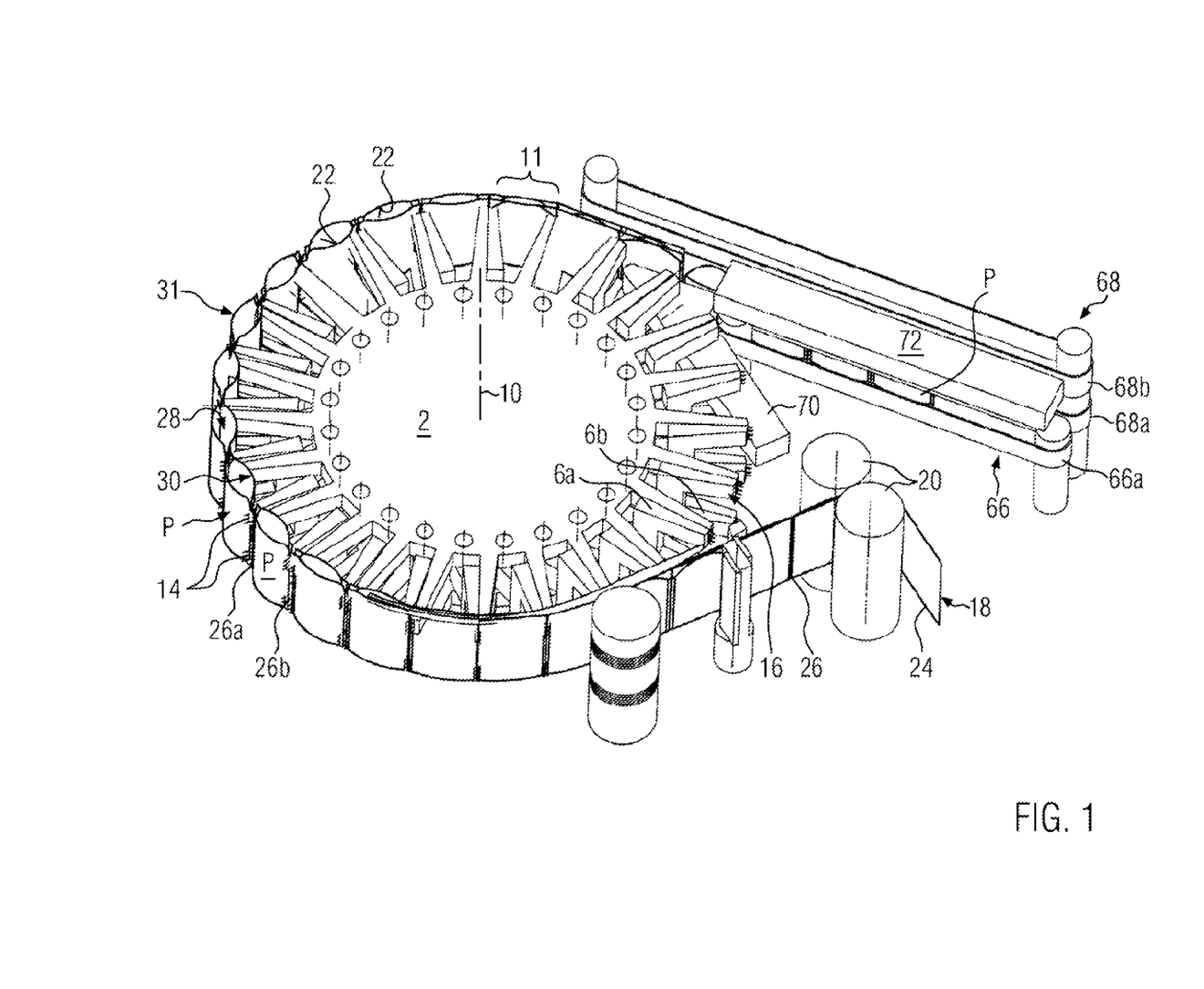
FIG. 1 is a perspective side view of a first embodiment.
Figure 2:
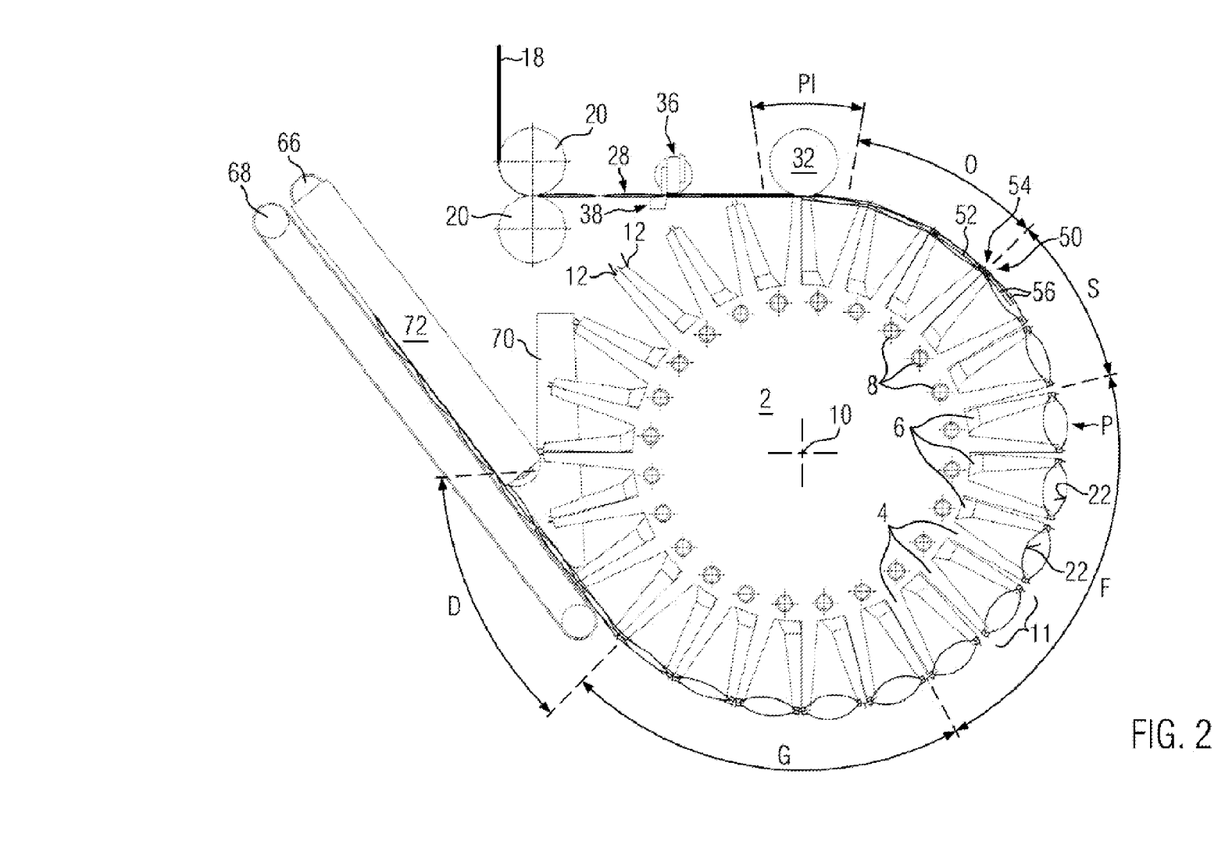
FIG. 2 is a top view of the first embodiment.

FIGS. 1 and 2 are provided to illustrate a filler wheel 2 of the inventive packaging apparatus. This filler wheel 2 comprises a plurality of leading arms 4 projecting in radial direction and being stationary held on the filler wheel 2 and a plurality of trailing arms 6 which are pivotably held about a joint 8 providing a pivot axis extending essentially parallel to a rotational axis 10 of the filler wheel 2. One leading and one trailing arm define a gripping unit 11.

From a radial end face 12 of each arm 4, 6 plural needles 14 project in radial direction of the filler wheel 2. As derivable in particular from FIGS. 1 and 4, each arm 4, 6 defines an upper segment 4a, 6a and a lower segment 4b 6b, respectively. The needles 14 are each provided on the upper segments 4a, 6a and the lower segments 4b, 6b. Between those upper segments 4a, 6a and the lower segments 4b, 6b, a recess 16 is formed projecting radially inwardly. The filler wheel 2 receives a continuous web 18 which is pulled by opposing pulling rollers 20. The continuous web 18 is received by the pulling rollers 20 as a folded web 18 in which confronting side surfaces 22 are joined along a bottom edge 24 formed by folding. This folded continuous web 18 is furthermore provided with vertical seals 26 defining therebetween pockets 28 which are vertically closed by the vertical seals 26 and, at their bottom, closed by the bottom edge 24, but have an unsealed opening 30 at and below their top edge 31. Respective folded continuous web 18 is e.g. prepared by a sealer previously described e.g. in WO 2007/089838 A2, the disclosure thereof being incorporated herein by reference.

At a piercing section PI, a pressure roll 32 is provided which is adapted to press the continuous web 18 against the radial end face 12 of the arms 4, 6, respectively. As in particular derivable from FIGS. 3 and 6, the pressure roll 32 is provided with circumferential groove 34 adapted to receive the needles 14. Between this pressure roll 32 and the pulling rollers 20, the web is conveyed on a linear path. Within said linear path, a rotating perforation knife 36 is provided which cooperates with a stationary knife counter-element 38. The perforation knife 36 and the knife counter-element 38 are adapted to provide a perforation 46 within the vertical seal 26 to divide the same into a leading sealing section 40 of a trailing length piece 48 and a trailing sealing section 42 of a leading length piece 48. In the embodiment shown in FIG. 4, the vertical seal 26 does not extend over the entire width, i.e. the vertical extension, of the continuous web 18. In fact, the vertical end section arranged above the upper segment 4a, 6a of each arm 4, 6 is not provided with a seal, thereby defining an unsealed vertical end section 44. This unsealed vertical end section 44 has an extension corresponding essentially to 10% of the overall width of the folded continuous web 18 starting from the top edge 31.

Figure 4:
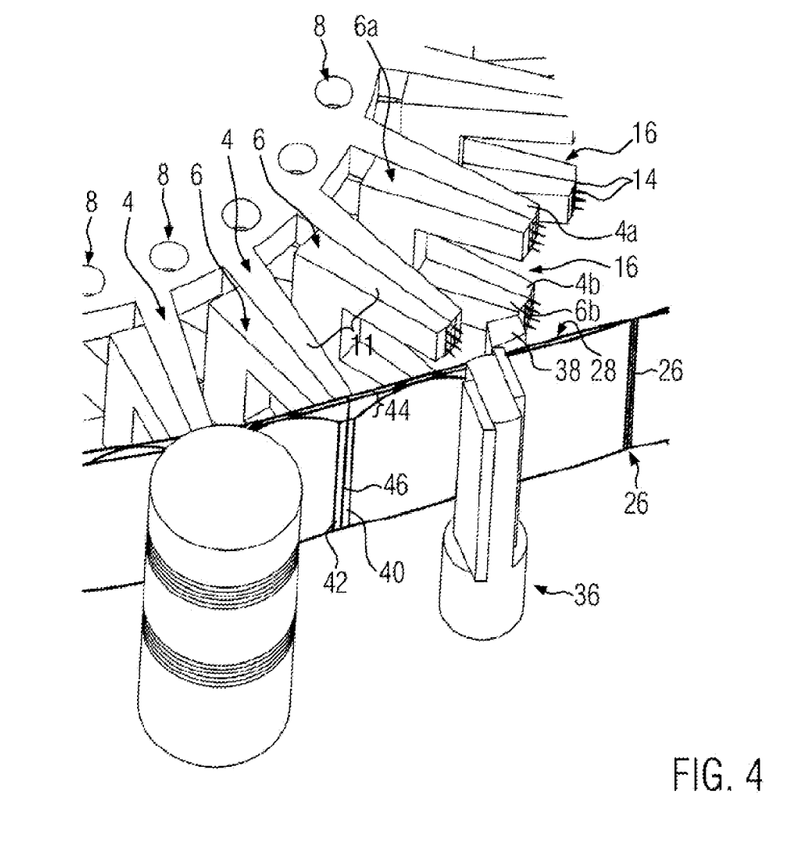
FIG. 4 is a perspective side view of a piercing section of the first embodiment.

In FIG. 4, the perforation 46 resulting from the treatment of the folded continuous web 18 by the perforation knife 36 and the knife counter-element 38 is depicted between the leading sealing section 44 and the trailing sealing section 42 of two neighboring length pieces 48 of the continuous folded web 18.

Figure 3:
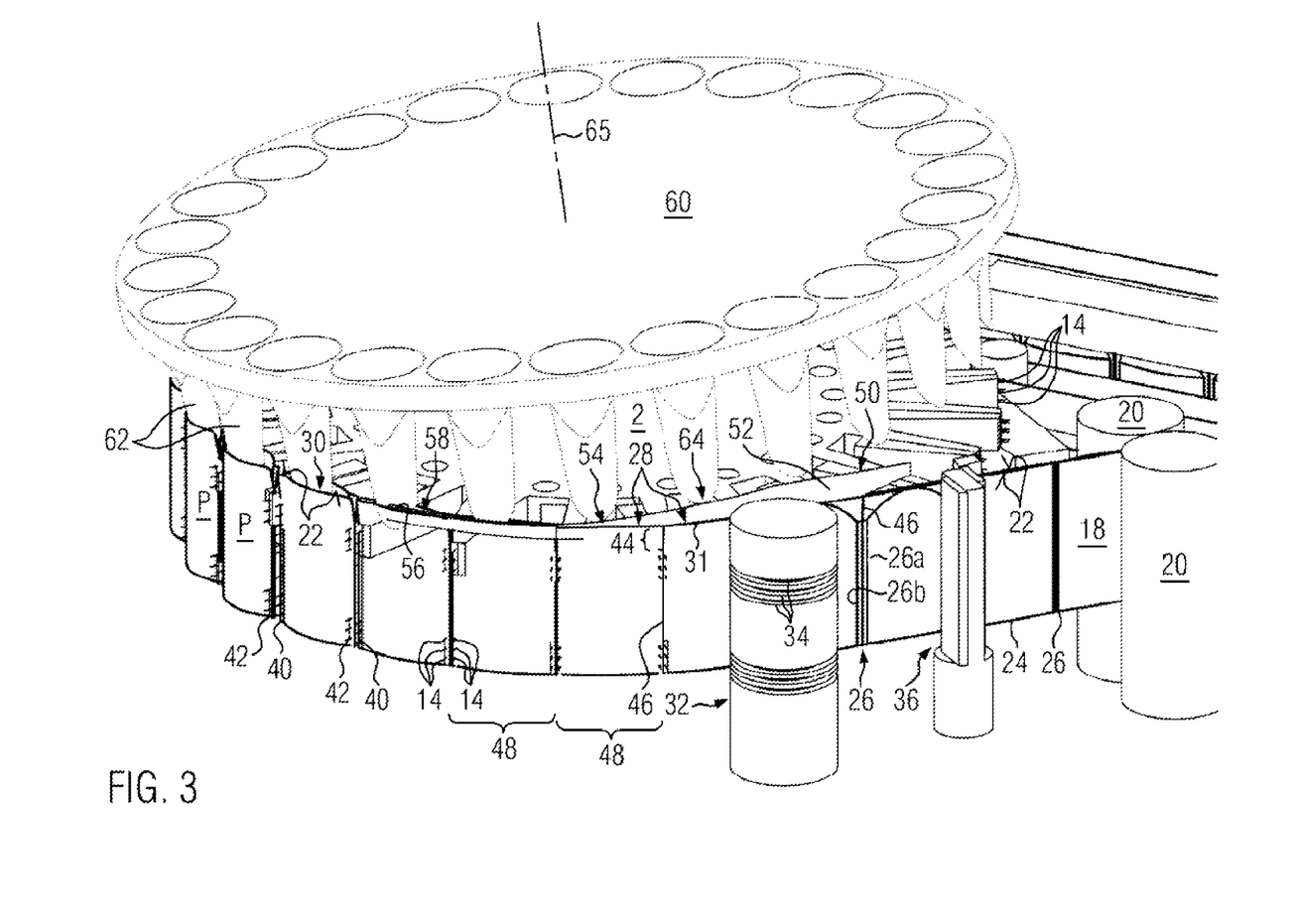
FIG. 3 is a perspective side view of the first embodiment with the spout wheel.

As in particular derivable from FIG. 3, the continuous folded web 18, when moved along the circular path, will cooperate with a longitudinal opening guide means 50. This longitudinal opening guide means 50 is bent to conform to the outer circumferential contour of the filler wheel 2 and is inclined relative to the plane in which the filler wheel 2 extends and which runs perpendicular to the rotational axis 10 the filler wheel 2. Accordingly, when moved along the circular path, the longitudinal opening guide means 50 is introduced through the unsealed opening 30 and arranged between the confronting side surfaces 22. A forward end of the longitudinal guide means 50 is formed by a single central guide rail 52 (see FIG. 5). This central guide rail 52 merges into a chamfered widening section 54 of the longitudinal opening guide 50, from which two parallel guide rails 56 project towards the rearward end of the longitudinal opening guide means 50 which parallel guide rails 56 extend parallel to each other and along the circular path for forming a longitudinal slot 58 therebetween.

Figure 5:
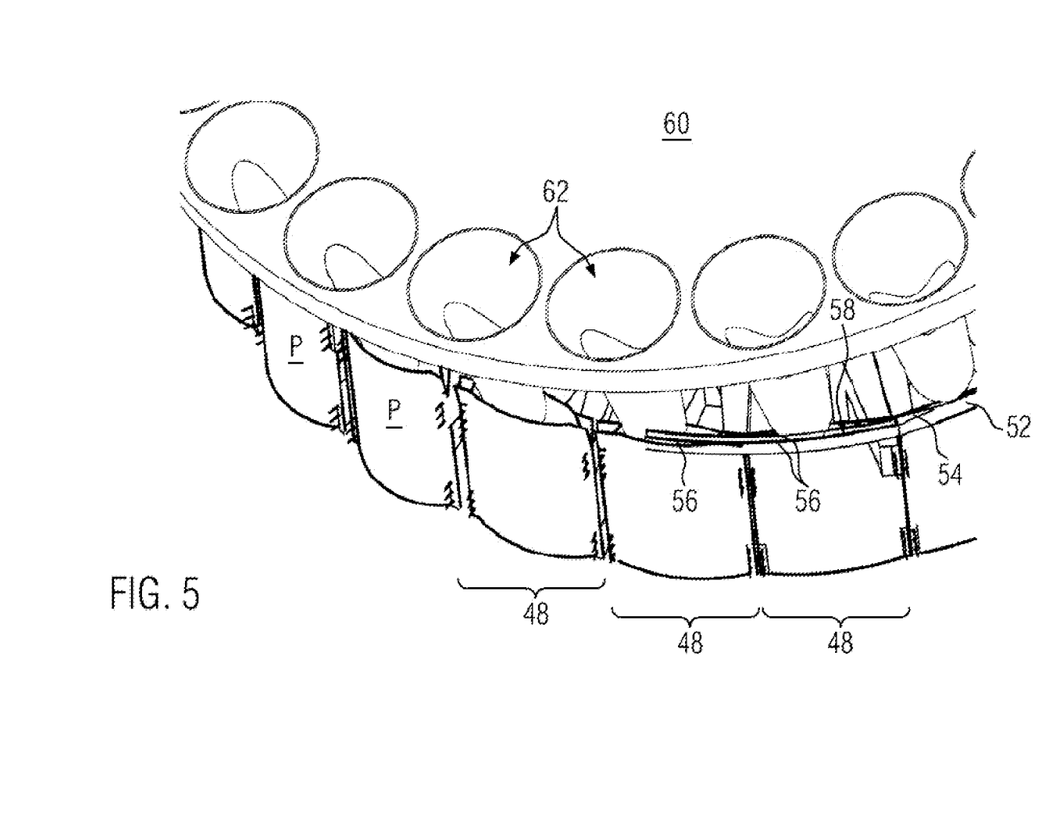
FIG. 5 is an enlarged perspective side view of an opening and separation section of the first embodiment.

As derivable in particular from FIGS. 3 and 5, the embodiment furthermore has a spout wheel 60 from which a plurality of spouts 62 extend which have a chamfered forward free end defining a tip 64. As the confronting side surfaces 22 are forced away from each other by the parallel guide rails 56, this forward tip 64 of the assigned spout 62 will enter into the longitudinal slot 58 and thereby between confronting side surfaces 22 defining the unsealed vertical end section 44. After the spout 52 has been introduced into the pocket 28 with its forward tip 64, the pocket 28 will run free from the longitudinal opening guide means 50 in the course of the rotational movement of the continuous web 18.

As derivable from FIGS. 3 and 4 in combination with FIG. 2, and as the longitudinal opening guide means 50 remain introduced into the pockets 28, the trailing arm 6 is pivoted so as to assume a position in which the radial end face 12 of the assigned trailing arm 6 is arranged closer to the respective radial end face 12 of the assigned leading arm 4 of the same gripping unit 11. By this pivotable movement, the neighboring length pieces 48 secured to respective arms 4, 6 by means of the needles 14 are torn apart and, thus, individual unsealed pouches P are formed. Each pouch P has a leading edge 26a formed by the leading vertical seals 26 and a trailing edge formed by the trailing vertical seals 26.

By the pivotable movement the distance between the leading edge 26a and the trailing edge 26b of a single length piece 48 is increased, leading to separation of individual pouches P. Further, by reducing the distance between the radial free end faces 12 of the assigned arms 4, 6, the confronting side surfaces 22 of a single pouch P are bent outwardly to open the pouches (see FIG. 5). Pivoting of the trailing arm 4 for tearing neighboring length pieces 48 apart essentially starts at a circumferential position of the filler wheel 2 corresponding to the position of the chamfered widening section 54 of the longitudinal opening guide means 50. This circumferential segment around the rotating filler wheel 2 is identified as a separation and opening section S in FIG. 2. This separation and opening section S is followed by a filling section F in rotational direction of the filler wheel 2. In the other direction and ahead of the separation and opening section S, there is provided an opening section in which the longitudinal opening guide means 50 are merged into the pockets 28. The segment comprising the pressure roll 32 is identified as a piercing section PI in which the continuous web 18 is pierced by the needles 14. The piercing section PI, the opening section O, the separation and opening section S as well as the filling section F are arranged around the circumference of the filler wheel 2 and, thus, on the circular path on which the continuous web 18 is conveyed when the filler wheel 2 is rotated.

In the filling section F, the spout wheel 60, having a rotational axis 65 slightly inclined relative to the rotational axis 10 of the filler wheel 2 while essentially being co-axially positioned in relation thereto, is brought closer to the filler wheel 2. Thus, the individual spouts 62 are introduced into the pouches P. Material is filled through the spouts 62 into the pouches P. Simultaneously, in the course of the rotation of the filler wheel 2 and of the spout wheel 60, the spouts 62 are withdrawn from the pouches P, while material is still being filled into the pouches P. At the end of the filler section F, the spout 62 is completely retracted from the assigned pouch P.

Along the rotational movement of the filler wheel 2 and, thus, along the circular path of the continuous web 18, the latter will be transferred from the filler section F to a closing section C. In this closing section C, the trailing arm 6 is pivoted back to its initial position in which it is arranged in the piercing section PI. In the course of this pivotable movement, the unsealed vertical end section 44 of the pouch P is straightened. The confronting side surfaces 22 are brought closer to each other, thereby closing the pouch P.

Figure 6:
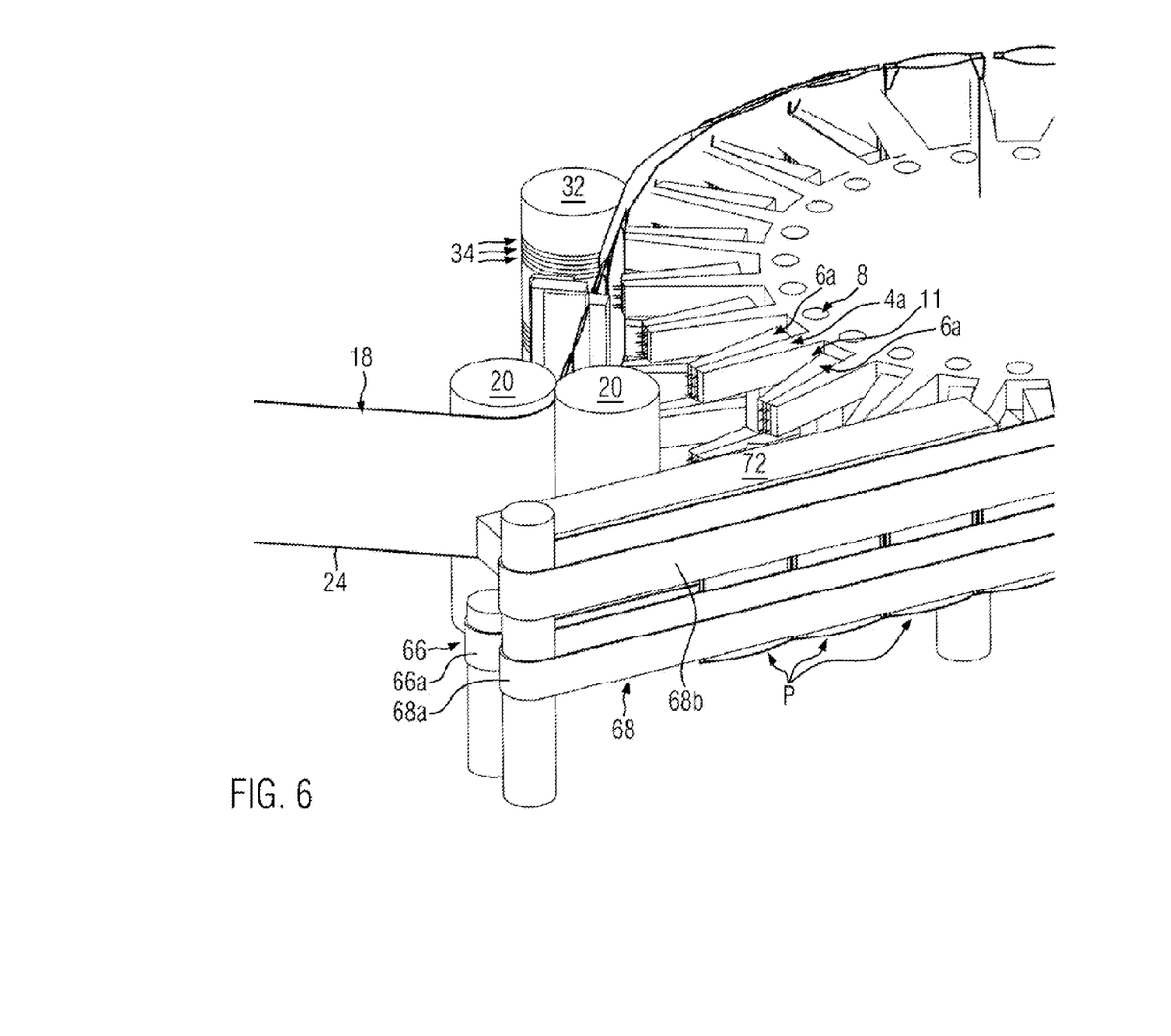
FIG. 6 is an enlarged perspective side view of a discharging section of the first embodiment.
Figure 7:
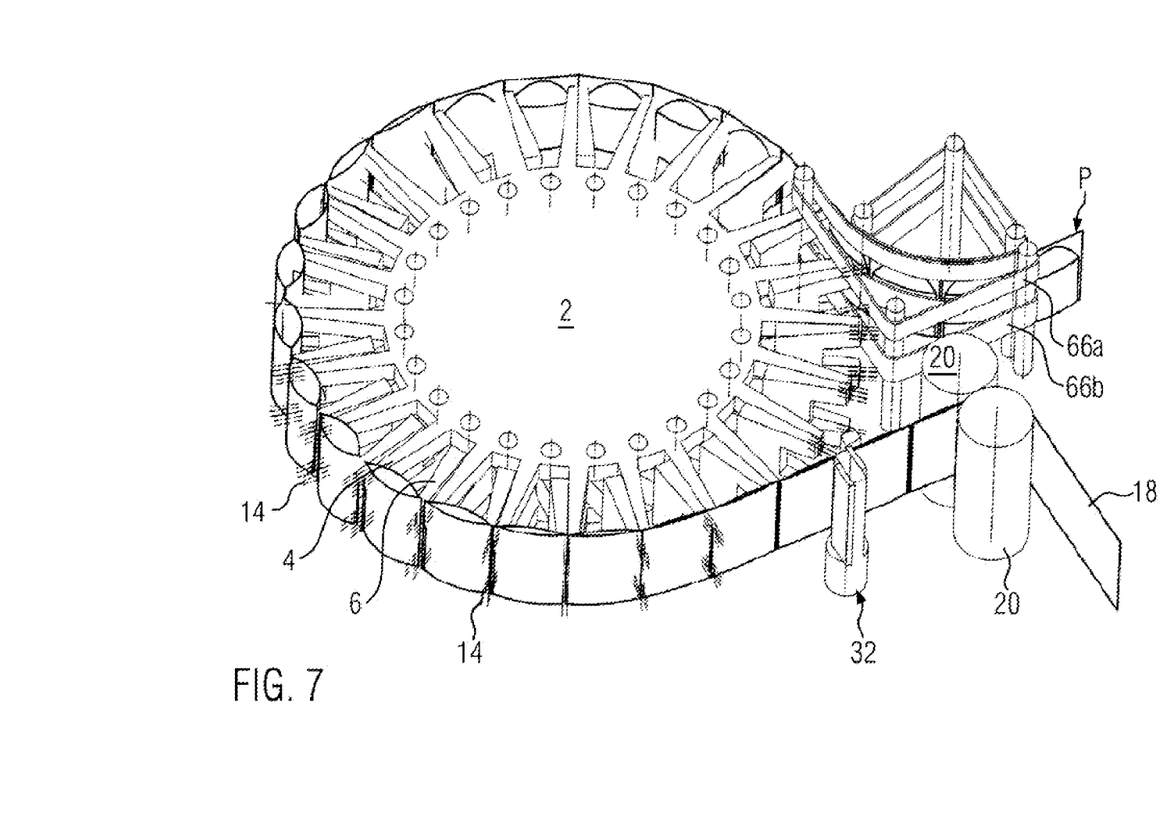
FIG. 7 is a perspective view of the second embodiment of the present invention.
Figure 8:
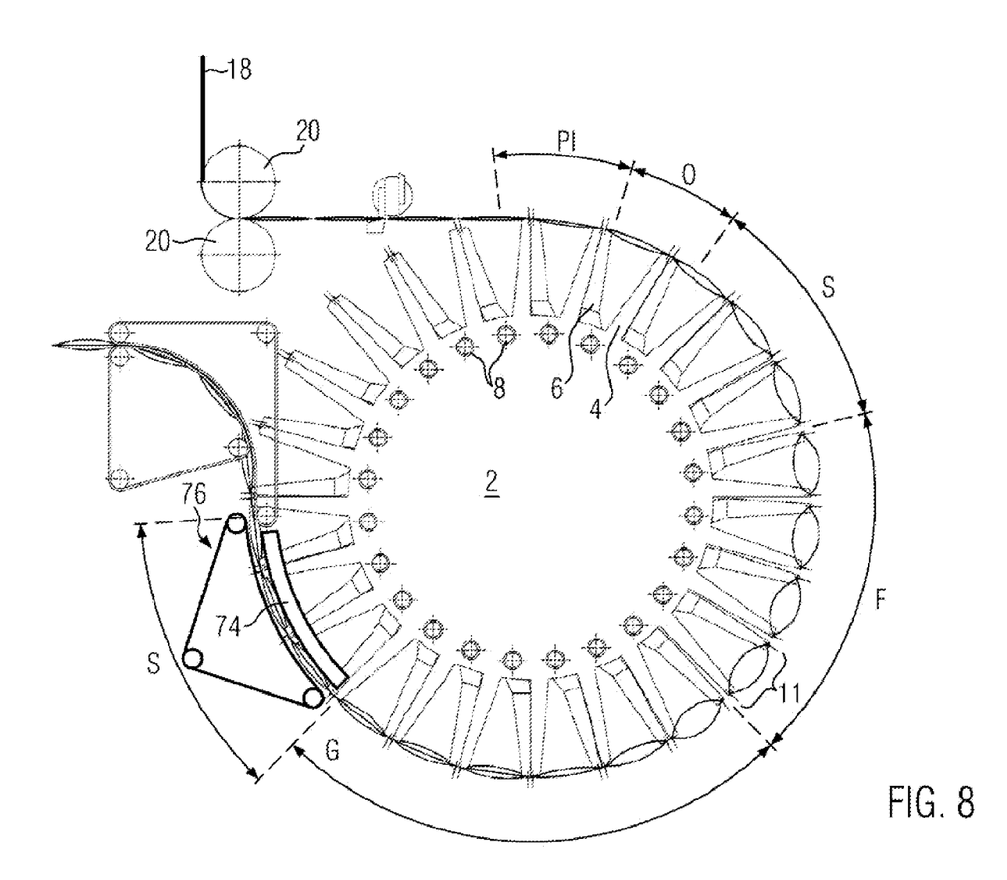
FIG. 8 is a top view of the second embodiment.

The closing section C is followed by a discharging section D in which the pouches P are transferred from the circular path and, thus, from the rotational movement of the filler wheel 2, to a linear sealing path formed between an inner conveyor belt 66 and an outer conveyor belt 68 which are depicted in further detail in FIG. 6. The discharging section D comprises a discharging guide 70 which projects into the filler wheel 2 and is arranged in the recess 16, i.e. between the upper segment 4a, 6a and the lower segment 4b, 6b of the respective arm 4, 6. This discharging guide 70 has a guide surface which forces each pouch P in radial direction away from the filler wheel 2, thereby forcing the material of the web 18 to be extracted from the needles 14. The movement of the pouches P affected by the discharging guide 70 is tangential to the filler wheel 2. The inner conveyor belt 66 has a single belt element cooperating with a lower section of the pouches P. The outer conveyor belt 68 has a lower belt element 68a assigned to the inner conveyor belt 66 and an upper conveyor belt 68b cooperating with the unsealed vertical end section 44. On the inner side, there is provided a head sealing means 72 for the purpose of fusing and thereby sealing the unsealed vertical end section 44 in order to seal the whole pouch P.

Figure 9:
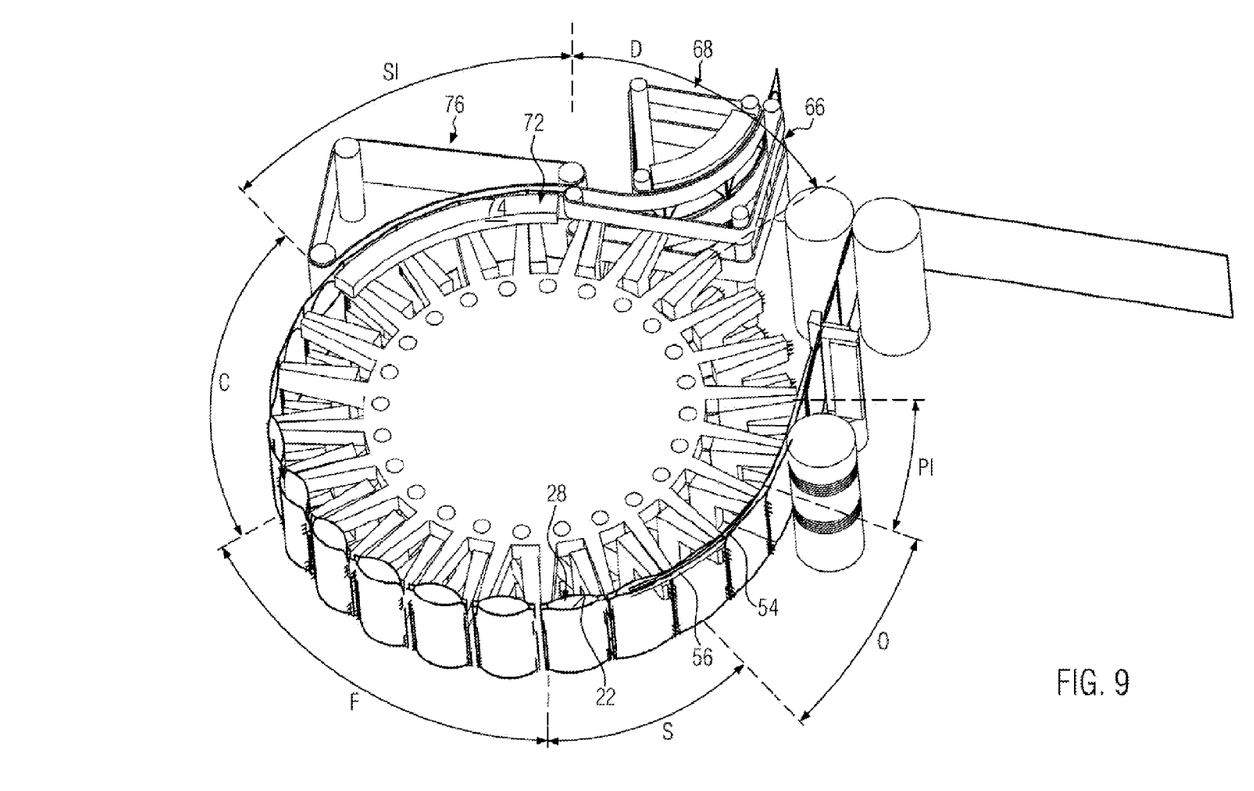
FIG. 9 is an enlarged perspective side view essentially in accordance with FIG. 7 elucidating the sealing section of the second embodiment.

FIGS. 7 to 10 visualize a second embodiment which is essentially identical with the first embodiment described above. Thus, identical parts are identified with respective reference signs as used for the first embodiment. However, the filing section F has a slightly reduced extension in circumferential direction. Between the closing section C and the discharging section D, there is provided a sealing section SI in which the unsealed opening 30 and the unsealed vertical end section 44 is sealed as the pouches P are moved on the circular path with the rotational movement on the filler wheel 2. Details of the sealing means SI are depicted in FIG. 9.

In FIG. 9 of the second embodiment, the head sealing means 72 is arranged above the filler wheel 2 to thereby provide a sealing section SI on the outer circumference of the filler wheel 2. The head sealing means 72 is provided with a heated bar 74 which is curved essentially corresponding to the outer radius of the filler wheel 2. This heated bar 74 is arranged slightly above the upper segment of each leading and trailing arm 4, 6, respectively, so as to cooperate with the unsealed vertical end section 44 of the pockets 28, which are pressed against the head sealing means 72 by an outer sealing belt 76.

Specifically, the head sealing means 72 have a guiding in section which is level with the radial end face 12 of each arm 4, 6 and a guiding out section which radially projects the forward tip provided by all needles 14. Accordingly, by means of the head sealing means 72 the open pockets 28 are forced away from at least the needles 14 provided by the upper segments 4a, 6a of the leading and trailing arm 4, 6, respectively, while at the same time pressing the unsealed vertical end section 44 against the outer sealing belt 76 and as the open pouches P are rotated with the filler wheel 2. After sealing the unsealed vertical end section 44 and thereby providing sealed pouches P, the same are discharged in the discharging section D.

Figure 10:
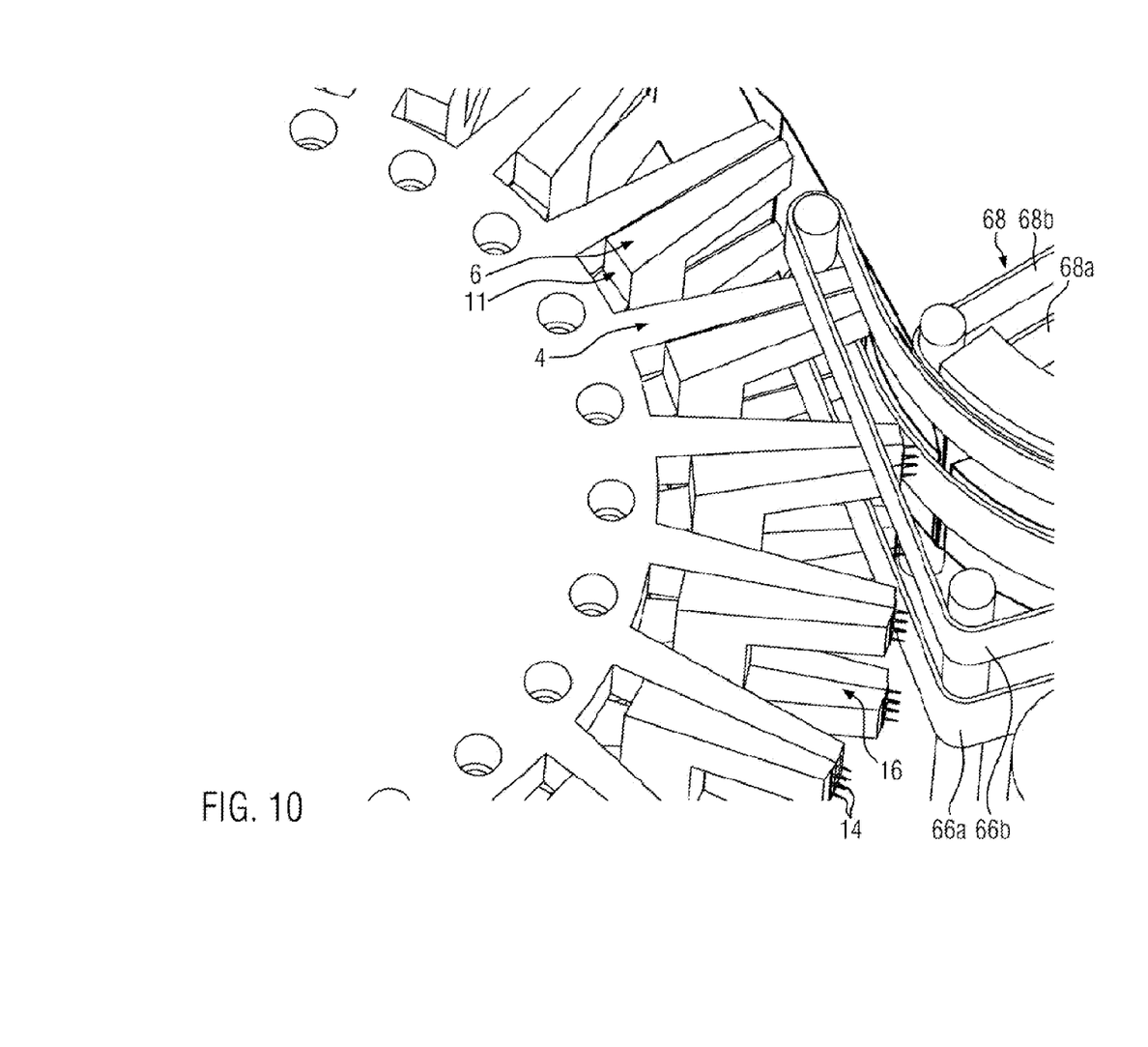
FIG. 10 is a perspective side view of the discharging section of the second embodiment.

The discharging section D comprises inner and outer conveyor belts 66, 68. Both of those conveyor belts 66, 68 have lower and upper conveyor belts a, b. The lower conveyor belt 66b of the inner conveyor belt 66 is arranged within the recess 16, while the upper conveyor belt 66a is arranged above the upper segment 4a, 6a of the arms 4, 6.

The conveyor belts 66, 68 are each guided by a curved guiding surface (not shown) to discharge the sealed pouches from the filler wheel 2.

REFERENCE SIGNS

2 filler wheel
4 leading arm
4a upper segment of leading arm
4b lower segment of leading arm
6 trailing arm
6a upper segment of trailing arm
6b lower segment of trailing arm
8 joint
10 rotational axis
11 gripping unit
12 radial end face
14 needle
16 recess
18 continuous web (folded)
20 pulling rollers
22 confronting side surfaces
24 bottom edge
26 vertical seal
26a leading edge
26b trailing edge
28 pocket
30 unsealed opening
31 top edge
32 pressure roll
34 circumferential groove
36 perforation knife
38 knife counter-element
40 leading sealing section
42 trailing sealing section
44 unsealed vertical end section
46 perforation
48 length piece
50 longitudinal opening guide means
52 central guide rail
54 chamfered widening section
56 parallel guide rail
58 longitudinal slot
60 spout wheel
62 spout
64 forward tip
65 rotational axis of the spout wheel
66 inner conveyor belt
66a lower inner conveyor belt
66a outer conveyor belt
68a lower outer conveyor belt
68b upper outer conveyor belt
70 discharging guide
72 head sealing means
74 heated bar
76 sealing belt
PI piercing section P pouch
S separation and opening section
F filling section
O opening section
C closing section
D discharging section
SI sealing section

The invention claimed is:

1. A method for making pouches comprising:
providing a continuous web;
folding the web to provide confronting side surfaces joined along a bottom edge;
forming a vertical seal between the confronting side surfaces, thereby providing a series of adjacent pockets having opposite side walls with each pocket having an unsealed opening along a top edge;
filling the pockets through the unsealed opening with material; and
sealing the unsealed opening, wherein the web is perforated by a perforation between a leading length piece of the web adapted to form a leading pocket and a trailing length piece of the web adapted to form a trailing pocket,
wherein the continuous web is abutted against an outer circumference of a rotating filler wheel to follow a circular path and wherein a distance between a trailing edge of the leading length piece and a leading edge of a trailing length piece is increased for tearing the leading and the trailing lengths pieces apart at the perforation while the length pieces are moved on the circular path;
wherein the trailing edge of a leading pocket is pierced by a trailing arm of a gripping unit of the filler wheel and the leading edge of a trailing pocket is pierced by a leading arm of the gripping unit and the leading and the trailing pockets are torn apart for forming open pouches by pivoting at least one of the leading and the trailing arms of the gripping unit toward the other of the trailing and the leading arms of said gripping unit.

2. The method according to claim 1, wherein the continuous web is perforated after the pockets have been formed.

3. The method as defined in claim 1, wherein the continuous web is pressed against the leading and the trailing arm by a rotating pressure roll.

4. The method according to claim 3, wherein after filling, the pouches are closed by pivoting at least one of the leading and the trailing arms away from the other of the trailing and the leading arms.

5. The method according to claim 1, wherein a longitudinal opening guide means is introduced between the confronting side surfaces and through the unsealed opening as the continuous web is abutted against the outer circumference of the rotating filler and that the confronting side surfaces are separated from each other by the longitudinal opening guide means until a spout of a spout wheel has been introduced into the pocket.

6. The method according to claim 5, wherein the leading and the trailing length pieces are torn apart after the longitudinal opening guide means are received between the confronting side surfaces.

7. The method according to claim 1, wherein the pouches are transferred from the circular path to a linear sealing path for sealing the opening.

8. A method for making pouches comprising:
providing a continuous web;
folding the web to provide confronting side surfaces joined along a bottom edge;
forming a vertical seal between the confronting side surfaces, thereby providing a series of adjacent pockets having opposite side walls with each pocket having an unsealed opening along a top edge;
filling the pockets through the unsealed opening with material; and
sealing the unsealed opening, wherein a longitudinal opening guide means is introduced between the confronting side surfaces and through the unsealed opening as the continuous web is abutted against the outer circumference of a rotating filler and that the confronting side surfaces are separated from each other by the longitudinal opening guide means until a spout of a spout wheel has been introduced into the pocket;
wherein the web is perforated by a perforation between a leading length piece of the web adapted to form a leading pocket and a trailing length piece of the web adapted to form a trailing pocket, wherein the continuous web is abutted against an outer circumference of a rotating filler wheel to follow a circular path, wherein a distance between a trailing edge of the leading length piece and a leading edge of a trailing length piece is increased for tearing the leading and the trailing lengths pieces apart at the perforation while the length pieces are moved on the circular path, wherein the continuous web is perforated after the pockets have been formed, and wherein the trailing edge of a leading pocket is pierced by a trailing arm of a gripping unit of the filler wheel and the leading edge of a trailing pocket is pierced by a leading arm of the gripping unit and the leading and the trailing pockets are torn apart for forming open pouches by pivoting at least one of the leading and the trailing arms of the gripping unit toward the other of the trailing and the leading arms of said gripping unit.

9. The method according to claim 8, wherein the leading and the trailing length pieces are torn apart after the longitudinal opening guide means are received between the confronting side surfaces.

10. The method according to claim 8, wherein after filling, the pouches are closed by pivoting at least one of the leading or the trailing arms away from the other of the trailing or the leading arms.

11. The method according to claim 8, wherein the pouches are transferred from the circular path to a linear sealing path for sealing the opening.

* * * * *